United States Patent
Raschke et al.

(10) Patent No.: US 9,718,219 B2
(45) Date of Patent: Aug. 1, 2017

(54) TEMPERATURE CONTROL DEVICE FOR A SHAPING TOOL AND METHOD OF CONTROLLING SAME

(71) Applicant: ENGEL AUSTRIA GmbH, Schwertberg (AT)

(72) Inventors: Florian Raschke, Ohlsdorf (AT); Josef Giessauf, Perg (AT)

(73) Assignee: Engel Austria GmbH, Schwertberg (AT)

( * ) Notice: Subject to any disclaimer, the term of this patent is extended or adjusted under 35 U.S.C. 154(b) by 603 days.

(21) Appl. No.: 14/171,964

(22) Filed: Feb. 4, 2014

(65) Prior Publication Data

US 2014/0217633 A1    Aug. 7, 2014

(30) Foreign Application Priority Data

Feb. 4, 2013   (AT) .................................. A 80/2013

(51) Int. Cl.
*B29C 35/02*  (2006.01)
*B29C 35/00*  (2006.01)
*B29C 45/78*  (2006.01)

(52) U.S. Cl.
CPC ........ *B29C 35/0294* (2013.01); *B29C 35/007* (2013.01); *B29C 45/78* (2013.01); *B29C 2945/76531* (2013.01); *B29C 2945/76545* (2013.01); *B29C 2945/76782* (2013.01); *B29C 2945/76913* (2013.01); *B29C 2945/76943* (2013.01)

(58) Field of Classification Search
None
See application file for complete search history.

(56) References Cited

U.S. PATENT DOCUMENTS 5,427,720 A  *  6/1995  Kotzab ............... B29C 35/0294
                                                                264/328.16

FOREIGN PATENT DOCUMENTS

| AT | 12 213 | 1/2012 |
|---|---|---|
| CN | 101073913 | 11/2007 |
| CN | 201261254 | 6/2009 |
| CN | 201998401 | 10/2011 |
| CN | 103185656 | 7/2013 |
| DE | 7326694 | 12/1973 |
| JP | 5-245894 | 9/1993 |

(Continued)

OTHER PUBLICATIONS

Chinese Search Report issued Nov. 4, 2015 in corresponding Chinese Application No. 201410129560.7.

(Continued)

*Primary Examiner* — Monica Huson
(74) *Attorney, Agent, or Firm* — Wenderoth, Lind & Ponack, L.L.P.

(57) ABSTRACT

A method of temperature control of a shaping tool or components of a shaping working machine is performed by a temperature control medium disposed in at least one temperature control branch of a temperature control system. A previously ascertained relationship between geometrical data of the at least one temperature control branch and through-flow amounts of the temperature control medium is provided, and a reference through-flow amount is set by the previously ascertained relationship for the geometrical data of the at least one temperature control branch.

6 Claims, 2 Drawing Sheets

(56) References Cited

FOREIGN PATENT DOCUMENTS

JP 2873667 3/1999
JP 3201712 8/2001

OTHER PUBLICATIONS

Austrian Patent Office Search Report (ASR) issued Aug. 21, 2013 in Austrian Patent Application No. A 80/2013.

* cited by examiner

TEMPERATURE CONTROL DEVICE FOR A SHAPING TOOL AND METHOD OF CONTROLLING SAME

BACKGROUND OF THE INVENTION

The present invention concerns a method of temperature control of a shaping tool of a shaping working machine, and an electronic control or regulating device.

The following discussion of the state of the art is implemented for example on the basis of an injection molding machine as a special case of a shaping working machine and on the basis of an injection molding tool of such an injection molding machine as an example of a shaping tool of a general shaping working machine. The disclosure of the following application, however, is not limited to that specific case.

In the state of the art, through-flow amounts of a temperature control medium for cooling and/or heating (in general, temperature control) of the injection molding tool were determined either in a scarcely reproducible fashion based on the experience of an operator of the injection molding machine or with the assistance of complicated and expensive instruments (simulation, measurement values obtained in the course of a tool specification and evaluation operation, and the like). Sometimes, the maximum possible through-flow amount (the through-flow in a temperature control branch or in a plurality of parallel temperature control branches is not limited by any control member) was also simply set.

The procedures in the state of the art suffer from a series of disadvantages. On the one hand, they are very complicated and expensive. On the other hand they are not suitable as a basis for more extensive investigations like for example:

would higher through-flow amounts have an influence on economy and quality of the shaped part?

what effects do fluctuations in the through-flow have on process reliability?

how do different through-flow amounts have an effect on energy efficiency?

SUMMARY OF THE INVENTION

The object of the invention is to provide in the simplest possible fashion an economical method of temperature control of a shaping tool of a shaping working machine, and a corresponding open or closed loop device.

In addition, the invention provides an arrangement having such an electronic open or closed loop control device and a temperature control device and for a shaping working machine, in particular an injection molding machine or a press machine having such an arrangement.

Preferably water (in gas or liquid form) or oil is provided as the temperature control medium. It is however also possible to use other fluids such as carbon dioxide or nitrogen. The temperature control medium can be delivered continuously or in pulsed fashion.

In the normal case, the temperature control device will have a temperature control branch or a plurality of temperature control branches connected in parallel. The cross-section of the passages of the temperature control branches can be for example round, oval, or polygonal. The shape of the cross-section is not an important consideration.

Implementation of the previously ascertained connection makes it possible to set a through-flow amount which allows economical operation of the temperature control device without having to rely on the experience of a user of the shaping working machine.

Generally, the previously ascertained relationship produces a connection between possible geometrical data and through-flow amounts. In most cases, the geometrical data involve diameter (or characteristic dimensions of the cross-section of the passage of the temperature control branch) of the individual temperature control branches of the temperature control system. If series-connected temperature control branches of the temperature control system have different characteristic dimensions, for example diameters, then for the discussions hereinafter reference is to be made to the largest characteristic dimension or the largest diameter.

If for example there is a relationship between a mean tool wall temperature and the through-flow amount (that can be ascertained empirically or by simulation), it may be advantageous if the previously ascertained relationship is expressed by Reynolds numbers. A Reynolds number is predetermined, and the reference or target through-flow amount is determined on the basis of the predetermined Reynolds number. That can be effected quite easily by the general formula for the Reynolds number (Re):

$$Re = \frac{\omega \cdot d}{\nu}.$$

In that respect, $\omega$ is the mean velocity of the flow of the temperature control medium, d is a characteristic dimensioning—in this case mostly a diameter of a passage of a temperature control branch, and $\nu$ is a kinematic viscosity of the temperature control medium.

As the Reynolds number is suitable for distinguishing between laminar and turbulent flow, it may be advantageous for the operator to select a Reynolds number in the turbulent range. In most cases, when using water as the temperature control medium, the transition from laminar to turbulent flow will begin at a Reynolds number of about 3,200 and will be concluded at a Reynolds number of 10,000. Therefore, a Reynolds number of over 10,000 should be adopted as in that range there is a particular lack of sensitivity (robustness) of the tool wall temperature in relation to fluctuations in the through-flow amounts. Reynolds numbers of greater than 15,000, 20,000, 25,000 or 30,000 are particularly preferred.

The reference through-flow amount of the temperature control medium must be so great, that the resulting Reynolds number is numerically in one of the above-specified ranges.

The Reynolds numbers can be easily calculated when using another temperature control medium.

In that respect, it may also be advantageous to take account of a temperature dependency of the kinematic viscosity of the temperature control medium in the formula for the Reynolds number.

To ensure homogeneous temperature control of the shaping tool, it is preferably provided that a relationship between mean temperature differences in the at least one temperature control branch and through-flow amounts of the temperature control medium is measured. When setting the reference through-flow amount, the relationship between mean temperature differences of the at least one temperature branch and the through-flow amounts is taken into consideration.

In that respect, one through-flow amount can be determined only having regard to the previously ascertained relationship between geometrical data and through-flow amounts, and a further through-flow amount is determined only having regard to the measured relationship between mean temperature differences and through-flow amounts. The maximum of the one through-flow amount and the further through-flow amount is set as the reference through-flow amount for the temperature control medium.

However, a mean of the one through-flow amount and the further through-flow amount can be set. It is possible in that way to reach a compromise between economy and quality of the injection molding products made.

In the most user-friendly situation, open or closed loop control to the reference through-flow amount is to be implemented by a setting member having an actuator in the temperature control branches. Naturally, manual control is also conceivable, in which case the reference through-flow amount is communicated to the operator by a visual display device.

BRIEF DESCRIPTION OF THE DRAWINGS

An embodiment of the invention will be described below with reference to the Figures, in which.

DETAILED DESCRIPTION OF THE INVENTION

Figure 1:
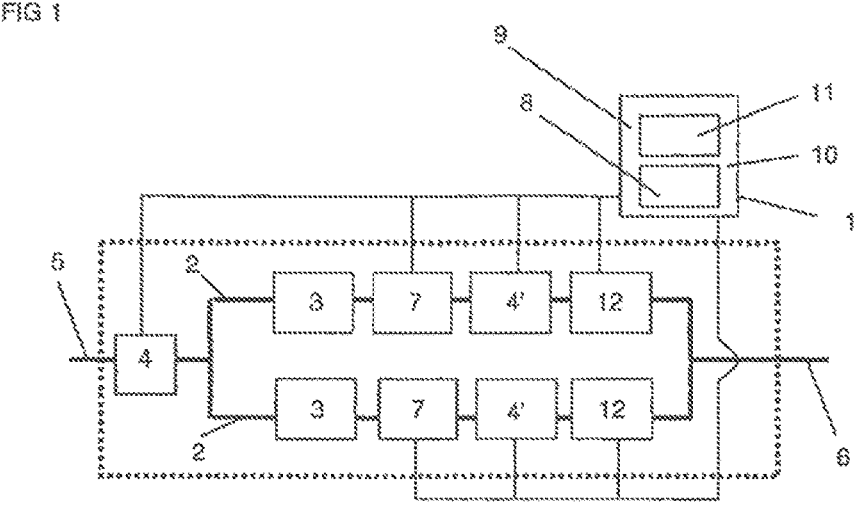
FIG. 1 is a diagram of an injection molding machine.

FIG. 1 is a diagrammatic view of a shaping working machine in the form of an injection molding machine, in the region of a shaping or mold tool 3 having an electronic open or closed loop control device 1 according to the invention. The above-described method can be in the form of a setting assistant in the open or closed loop control device 1. It has an input device 8, a computing unit 9, a memory unit 10, and an output device 11.

It is possible to see parallel temperature control branches 2 through which a temperature control medium (here: water) flows through the shaping tool 3. The temperature of the temperature control medium in the feed 5 to the shaping tool 3 can be ascertained by a temperature sensor 4 which is in signal-transmitting connection with the open or closed loop control device 1. A respective further temperature sensor is arranged in the return from the respective temperature control branch. It is also possible to see a respective through-flow amount sensor 7 for each temperature control branch, and these sensors are also arranged in the returns from the latter. Preferably, a temperature control medium distributor in accordance with AT 12 213 U1 is used. The sensors 4, 4', 7 are already integrated therein.

Illustrated by way of example for each temperature control branch 2 is an actuator 12 which sets the through-flow amounts.

Figure 2:
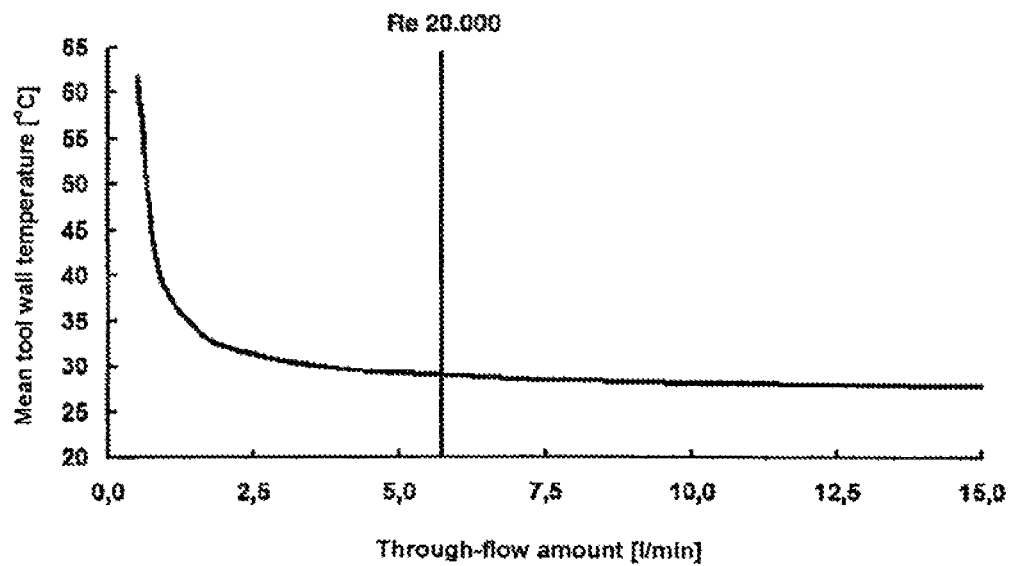
FIG. 2 is a graph showing the mean tool wall temperature and through-flow amount.
Figure 3:
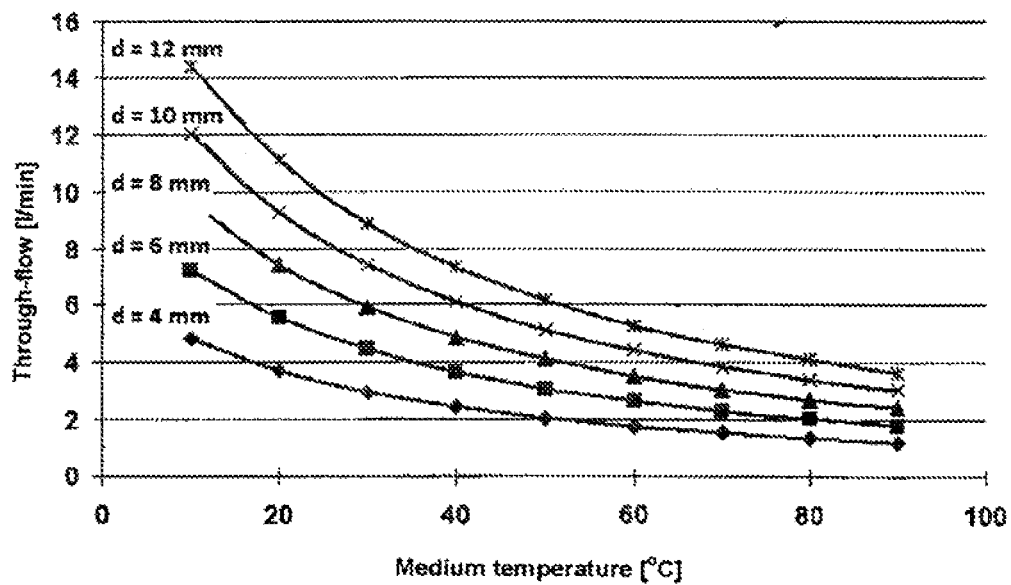
FIG. 3 is a graph showing the through-flow amount and the temperature of the temperature control medium.

In regard to FIGS. 2 and 3, it is assumed that the numerical values specified therein were calculated for a temperature control medium in the form of water, FIG. 3 being based on a predetermined Reynolds number Re of 20,000.

FIG. 2 shows along the ordinate the mean tool wall temperature in degrees Celsius, and along the abscissa the through-flow amount in liters per minute of the temperature control medium in a temperature control branch 2. In the region of the origin, it is possible to see a very severe change in the mean tool wall temperature upon a variation in the through-flow amount. In contrast, remote from the origin, scarcely any change in the mean tool wall temperature is to be noted upon a variation in the through-flow amount. Here robust operation of the temperature control device is therefore possible. If there is a wish to operate in the robust region economically in the sense of energy consumption of the temperature control device, then in the graph in FIG. 2 operation will be established as far to the left as possible in the robust region. A possible operating point of that nature is illustrated by way of example by a vertical line. That corresponds to a Reynolds number Re of 20,000. Depending on how robustly and/or economically operation is to be implemented, it is possible to select the operating point in FIG. 2 further to the left or further to the right. An operating point placed further to the right requires more energy but has the advantage of a shorter cycle time, while an operating point placed further to the left requires less energy but has the disadvantage of a longer cycle time and a lower level of robustness. The illustrated Reynolds number of 20,000 represents an advantageous compromise in that respect. The configuration of the relationship between mean tool wall temperature and through-flow amount is independent of the tool, plasticised plastic material and so forth.

FIG. 3 shows along the ordinate the through-flow amount of the temperature control medium in a temperature control branch 2 in liters per minute, and along the abscissa the temperature of the temperature control medium, ascertained by the temperature sensor 4, in the feed 5, in degrees Celsius. The minimum required through-flow amount which is required to achieve a predetermined Reynolds number Re can be ascertained by this graph. The illustrated graph applies to a Reynolds number Re of 20,000 and water as the temperature control medium. Families of curves for different bore diameters are shown, for example a minimum through-flow amount of 4.5 liters per minute occurs independently of the shaped part produced, the tool used and so forth with a feed temperature of 60° C. when using water and a bore diameter of 10 mm.

The above-described method of establishing the minimum reference through-flow amount can be carried out for each of the temperature control branches 2.

Preferably, the described method of ascertaining the minimum reference through-flow amounts is carried out in the on-going shaping process.

The invention claimed is:

1. A method of controlling a temperature of a shaping tool or components of a shaping working machine via a temperature control medium flowing through at least one temperature control branch of a temperature control system, said method comprising:
    providing a previously ascertained relationship between geometrical data of the at least one temperature control branch and through-flow amounts of the temperature control medium; and
    setting a reference through-flow amount based on the previously ascertained relationship for the geometrical data of the at least one temperature control branch;
    wherein the previously ascertained relationship is expressed by Reynolds numbers, each of the Reynolds numbers being predetermined, and the reference through-flow amount being determined on the basis of the respective predetermined Reynolds number.

2. The method as set forth in claim 1, wherein the geometrical data include at least a diameter—or in the case of non-circular cross-sections a characteristic dimension equivalent to the diameter—of a passage of the at least one temperature control branch.

3. The method as set forth in claim 1, wherein said setting the reference through-flow amount comprises setting the through-flow amount such that the resulting Reynolds number is greater than or equal to the predetermined Reynolds number.

4. The method as set forth in claim 1, wherein a temperature of the temperature control medium is taken into consideration for expressing the previously ascertained relationship by Reynolds numbers.

5. The method as set forth in claim 1, further comprising measuring a relationship between mean temperature differences in at least one temperature control branch and through-flow amounts of the temperature control medium, and wherein said setting the reference through-flow amount is at least partly based on the measured relationship between mean temperature differences of the at least one temperature branch and the through-flow amounts.

6. The method as set forth in claim 5, wherein said setting the reference through-flow amount comprises:
   determining a first through-flow amount based only on the previously ascertained relationship between geometrical data and through-flow amounts,
   determining a second through-flow amount based only on the measured relationship between mean temperature differences and through-flow amounts, and
   setting the maximum of the first through-flow amount and the second through-flow amount as the reference through-flow amount for the temperature control medium.

\* \* \* \* \*